(12) United States Patent
Osakabe

(10) Patent No.: US 7,884,974 B2
(45) Date of Patent: Feb. 8, 2011

(54) IMAGE SENSOR, IMAGE SENSOR UNIT, AND IMAGE SCANNING DEVICE

(75) Inventor: Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1039 days.

(21) Appl. No.: 11/624,331

(22) Filed: Jan. 18, 2007

(65) Prior Publication Data

US 2007/0165289 A1    Jul. 19, 2007

(30) Foreign Application Priority Data

Jan. 18, 2006    (JP)    ............................. 2006-009890

(51) Int. Cl.
*H04N 1/04*    (2006.01)
(52) U.S. Cl. ...................... 358/471; 358/483; 358/497; 358/474
(58) Field of Classification Search ................. 358/497, 358/474, 494, 483, 482, 471, 400, 500; 250/239, 250/208.1, 234–236; 355/40, 41; 399/211
See application file for complete search history.

(56) References Cited

U.S. PATENT DOCUMENTS

| 5,468,943 A | * | 11/1995 | Gatto et al. | .................. 235/454 |
| 5,769,515 A | * | 6/1998 | Chang | .................... 312/223.2 |
| 6,285,441 B1 | | 9/2001 | Takahara | |
| 6,765,648 B2 | | 7/2004 | Takahara | |

FOREIGN PATENT DOCUMENTS

| JP | H07-115506 A | 5/1995 |
| JP | H11-168592 A | 6/1999 |
| JP | 2007-194914 A | 8/2007 |

\* cited by examiner

*Primary Examiner*—Cheukfan Lee
(74) *Attorney, Agent, or Firm*—Baker Botts L.L.P.

(57) ABSTRACT

An image sensor includes: a case that extends in a longitudinal direction; and a first positioning member that is disposed at one end portion in the longitudinal direction of the case, the first positioning member positioning the case in the longitudinal direction.

12 Claims, 13 Drawing Sheets

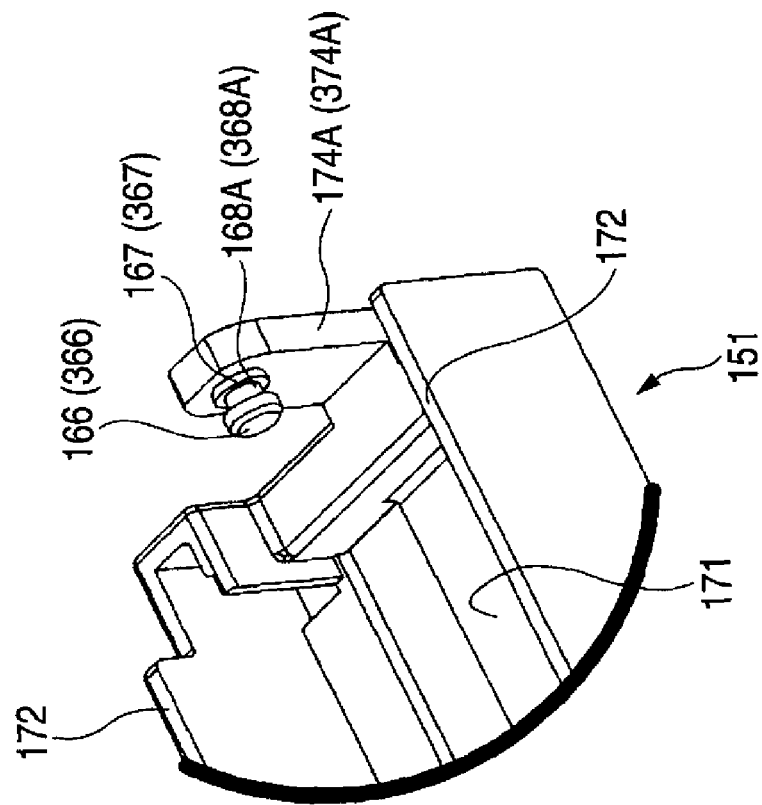
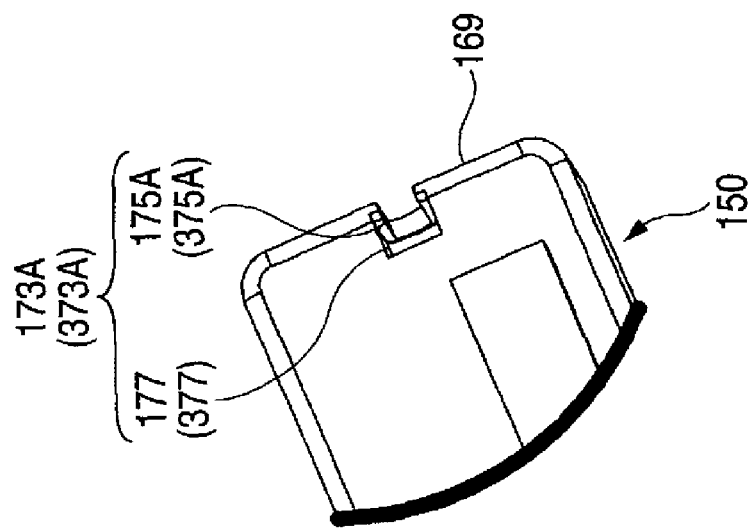

IMAGE SENSOR, IMAGE SENSOR UNIT, AND IMAGE SCANNING DEVICE

CROSS-REFERENCE TO RELATED APPLICATION

This application claims priority from Japanese Patent Application No. 2006-009890, filed on Jan. 18, 2006, the entire subject matter of which is incorporated herein by reference.

TECHNICAL FIELD

Aspects of the present invention relate to an image sensor that: irradiates light to an object to be scanned, such as a sheet or a document; converts light reflected from the object photoelectrically into an electrical signal; and outputs the electrical signal to a controller. Aspects of the present invention also relate to an image scanning device in which a carriage mounted with the image sensor moves back and forth in parallel to a scanning face on which the object is placed.

BACKGROUND

Conventionally, there is known a copying machine or a multi-function machine mounted with an image scanning device for scanning an image recorded on a sheet. The image scanning device is usually of a type called flat-bed scanner (FBS) including: a platen glass on which a sheet (document) is placed; and an image sensor unit that is disposed under the platen glass so as to move back and forth in parallel to the glass plane. See JP-A-11-168592 for example. The image sensor unit may have a structure in which an image sensor, such as a CCD (Charge Coupled Device) or a CIS (Contact Image Sensor), is mounted on a retention member, such as a carriage.

In the image sensor unit described in JP-A-11-168592, an image sensor having a rectangular solid shaped case is mounted on a retention member. The image sensor unit scans an image from an object to be scanned, such as a sheet or a document, in two directions configured as a primary scanning direction and a secondary scanning direction. The primary scanning direction is configured to be in parallel to a longitudinal direction of the image sensor unit, and the secondary scanning direction is configured to be in perpendicular to the longitudinal direction.

The case of the image sensor has a pair of rotation shafts having a common axis extending parallel to the longitudinal direction. The rotation shafts are provided on surfaces of a pair of concave portions (insertion portions) that are provided at positions slightly inward from both end faces of the case in the longitudinal direction. The rotation shafts are inserted into rotation holes (rotation bearings) formed in the retention member. The image sensor is thus rotatably supported by the retention member.

When assembling the image sensor and the retention member, the positioning of the image sensor relative to the retention member is performed by engaging a protruded portion, which is provided in the retention member and has a width, with a groove portion, which is provided in the case of the image sensor and has a width in the longitudinal direction.

A procedure of forming the image sensor unit by assembling the image sensor and the retention member will be briefly described in below.

First, the end of each rotation shaft of the image sensor and the corresponding rotation hole of the retention member are disposed opposite to each other, and then the rotation shaft is inserted and fitted into the rotation hole. At this time, the groove portion of the image sensor and the protruded portion of the retention member are positioned to engage with each other.

Next, when the retention member is rotated with respect to the image sensor, the protruded portion of the retention member engages with the groove portion of the image sensor, and thus the image sensor is positioned relative to the retention member in the primary scanning direction, thereby forming the image sensor unit.

In a so-called flat-bed type image scanning device, the longitudinal direction of the case is configured as the primary scanning direction and the transverse direction of the case is configured as a secondary scanning direction. The image sensor unit scans image while being moved in the secondary scanning direction relative to an object to be scanned (hereinafter, simply referred to as a "scanned original").

When performing the scan, a movement distance or the image sensor unit in the secondary scanning direction is equal to or greater than the length of the scanned original in the secondary scanning direction. A maximum movement distance of the image sensor unit in the secondary scanning direction is equal to or greater than a length obtained by adding a length of the image sensor unit in the transverse direction and the length of the scanned original having a maximum size, which is scannable by the image scanning device mounted with the image sensor unit, in the secondary scanning direction.

Accordingly, a size of the image scanning device in the secondary scanning direction becomes equal to or greater than the maximum movement distance of the image sensor unit in the secondary scanning direction.

However, in the conventional image sensor unit as described in JP-A-11-168592, the groove portion and the protruded portion positioning the image sensor relative to the retention member in the primary scanning direction are provided at the above-mentioned positions of the image sensor and the retention member, respectively. Accordingly, the length of the image sensor unit in the transverse direction includes the length of positioning members (the groove portion and the protruded portion) in the secondary scanning direction.

Since a light emitting portion and a light receiving portion are arranged in the longitudinal direction of the case of the image sensor, the image sensor needs to have the length in the secondary scanning direction for accommodating the light emitting portion and the light receiving portion as well as the necessary length for the positioning members.

Accordingly, the image sensor unit requires a certain amount of size in the secondary scanning direction, and thus the image scanning device requires certain amount of size in the secondary scanning direction.

Generally, there is known that, when a gap between an upper surface of the image sensor and a bottom surface of the platen glass varies, the distance between the upper surface of the image sensor and the scanned original placed on the platen glass also varies, and thus, the image cannot be satisfactorily scanned from the scanned original. This problem becomes more apparent if the image sensor unit uses a CIS for the image sensor, because CIS has a relatively small focal depth. Accordingly, it is necessary to position the upper surface of the image sensor with respect to the bottom surface of the platen glass with high accuracy, in order to maintain the gap, between the upper surface of the image sensor and the bottom surface of the platen glass, constant.

However, in the conventional image sensor unit as described in JP-A-11-168592, the shaft provided in the image sensor is inserted and fitted into the rotation hole (rotation bearing) provided in the retention member. Therefore, the image sensor is not configured to be movable at its rotation shafts in vertical direction with respect to the retention member. Accordingly, when a gap between the bottom surface of the platen glass and the retention member varies, the gap between the upper surface of the image sensor and the bottom surface of the platen glass varies accordingly, and thus the image sensor becomes unable to satisfactorily scan an image from the scanned original.

In the conventional image sensor unit as described in JP-A-11-168592, since the image sensor is rotatably held by the retention member, and the axis of the rotation is being configured near one end in the transverse direction of the case of the image sensor, the rotation with a very small angle largely varies the gap between the upper surface of the image sensor and the bottom surface of the platen glass. Thus, the image sensor may not satisfactorily scan the image from the scanned original.

SUMMARY

According to a first aspect of the present invention, there is provided an image sensor including: a case that extends in a longitudinal direction; and a first positioning member that is disposed at one end portion in the longitudinal direction of the case, the first positioning member positioning the case in the longitudinal direction.

According to a second aspect of the present invention, there is provided an image sensor unit including: an image sensor that emits light to an object and outputs electrical signal in accordance with light reflected by the object; and a retention member that retains the image sensor. The image sensor includes: a case that extends in a longitudinal direction; and a first positioning member that is disposed at one end portion in the longitudinal direction of the case. The retention member includes: a frame that extends in the longitudinal direction; and a second positioning member that is disposed at one end portion in the longitudinal direction of the frame. The case is positioned relative to the frame in the longitudinal direction by engaging the first positioning member with the second positioning member.

According to a third aspect of the present invention, there is provided an image scanning device including: a platen glass on which a document to be scanned is placed; and an image sensor unit that is provided beneath the platen glass to be movable in a predetermined direction along the platen glass. The image sensor unit includes: an image sensor that emits light to an object and outputs electrical signal in accordance with light reflected by the object; and a retention member that retains the image sensor. The image sensor includes: a case that extends in a longitudinal direction that is perpendicular to the predetermined direction; and a first positioning member that is disposed at one end portion in the longitudinal direction of the case. The retention member includes: a frame that extends in the longitudinal direction; and a second positioning member that is disposed at one end portion in the longitudinal direction of the frame. The case is positioned relative to the frame in the longitudinal direction by engaging the first positioning member with the second positioning member.

BRIEF DESCRIPTION OF THE DRAWINGS

In the accompanying drawings:

FIG. 10A is a partially enlarged view of the image sensor shown in FIG. 9, and FIG. 10B is a partially enlarged view of the carriage shown in FIG. 9;

DESCRIPTION

Hereinafter, examples of the present invention will be described with reference to the drawings.

Specific devices to be described below are only examples of the aspects of the invention. The scope of the present invention would not be limited to the specific examples described in detail below.

Hereinafter, a configuration of a first example according to the present invention will be described.

An image scanning device 1 is used, for example, as a scanner unit of a multi-function device (MFD) having a printer function and a scanner function or as an image scanner unit of a copying machine. The printer function is not essential to the apparatus for which the image scanning device 1 is used. The image scanning device 1 may be embodied into a flat-bed scanner (FBS) having only a scanner function.

Figure 1:
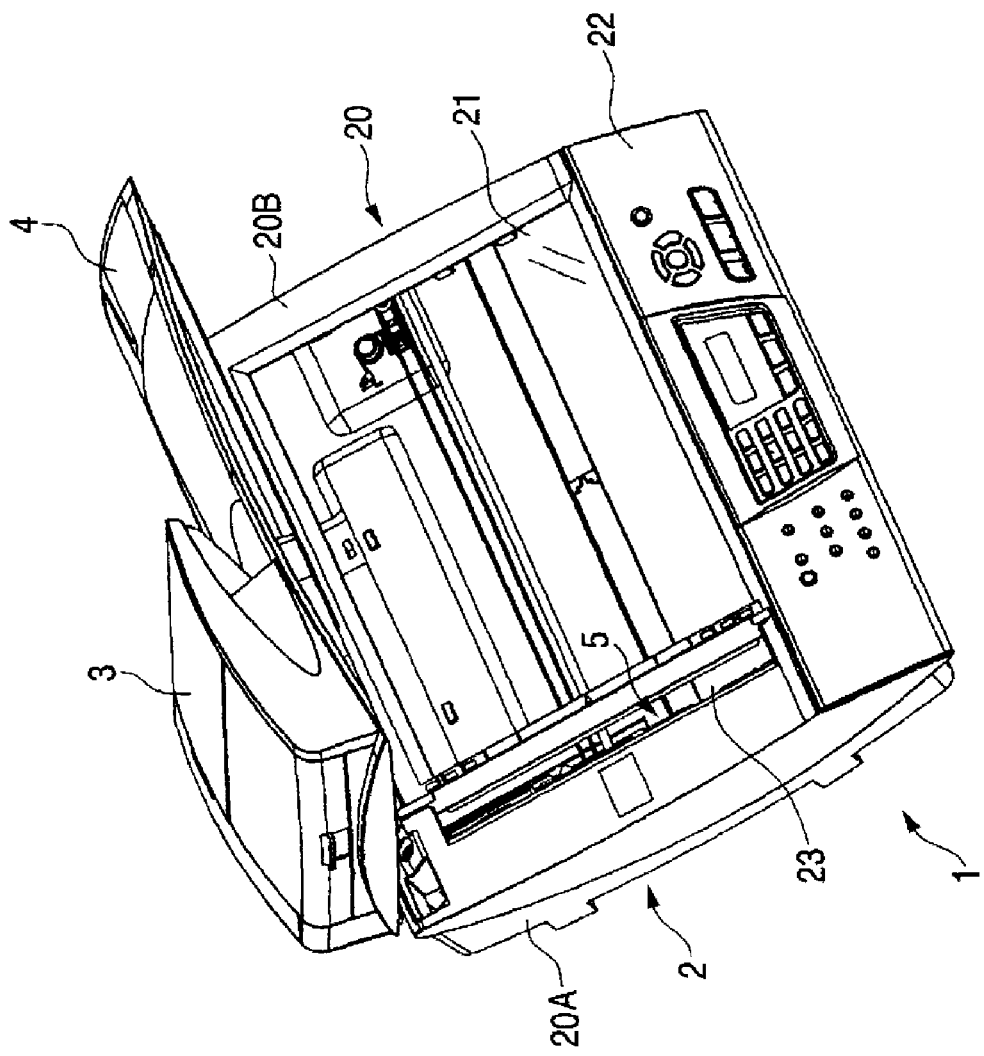
FIG. 1 is a perspective view illustrating an outer configuration of an image scanning device according to a first example of the present invention.

As shown in FIG. 1, the image scanning device 1 includes: a scanning platform 2 that serves as the flat-bed scanner; and a cover 4 that is attached to the scanning platform 2 so as to be freely opened and closed, the cover 4 being provided with an auto document feeder (ADF) 3. The scanning platform 2 is provided with: a substantially rectangular-solid shaped case 20; a platen glass 21 that is disposed on the top surface of the case 20; and an image scanning unit 5 that is built in the case 20.

A top surface of the platen glass 21 serves as a plane on which a document (scanned original) is to be placed. When the image scanning device 1 is used as the flat-bet scanner (FBS), a document as the scanned original is placed on the platen glass 21. And by closing the cover 4, the document is held down by the cover 4 and stabilized. Subsequently, the image scanning unit 5 scans under the platen glass 31, to thereby scan an image of the document.

An operation panel 22 is provided on the front face of the scanning platform 2. The operation panel 22 includes a variety of operation buttons and a liquid crystal display unit. The image scanning device 1 operates in accordance with an instruction input by a user through the operation panel 2. When the image scanning device 1 is embodied as a multifunction device (MFD), the image scanning device 1 is also operable in accordance with an instruction output through a scanner driver from a computer connected thereto, in addition to the instruction input through the operation panel 22.

The cover 4 is provided with an auto document feeder (ADF) 3 that feeds documents placed on a document tray to an ejection tray. When a document is fed by the ADF 3, the document passes through a platen 23. The image scanning unit 5 disposed under (beneath) the platen 23 scans an image of the document. In the image scanning device 1, an implementation of the ADF 3 may be optional.

Figure 2:
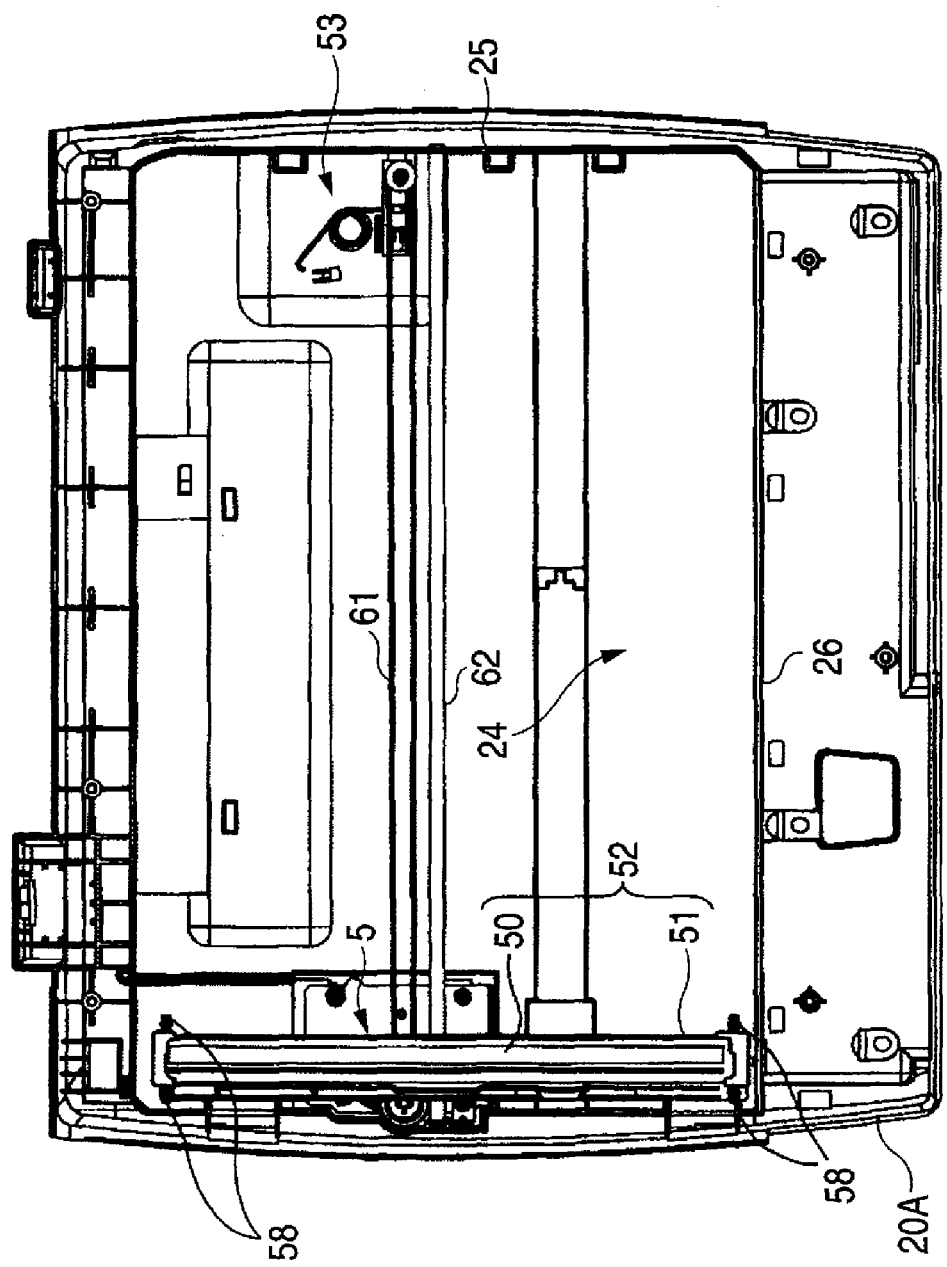
FIG. 2 is a plan view illustrating an inner configuration of a scanning platform.

The case 20 of the scanning platform 2 is configured by a lower frame 20A having a box shape of which an upper face is opened, and an upper cover 20B in which an opening for exposing the platen glass 21 is formed at a central part thereof. As shown in FIG. 2, the image scanning unit 5 is disposed in the lower frame 20A. The lower frame 20A and the upper cover 20B are made of synthetic resin.

The lower frame 20A is configured by: a base portion 24 serving as a bottom plate; a side wall 25 rising upright from the periphery of the base portion 24; and a partition plate 26 partitioning an area for installing the image scanning unit 5 and an area for installing a circuit board for the operation panel 22, all of which are monolithically formed. The lower frame 20A is provided with: support ribs that support the platen glass 21; boss portions for screwing a variety of members; and through holes for electrical wiring. However, the configuration of the lower frame 20A may be appropriately designed in accordance with a configuration of the scanning platform 2, and thus detailed description of the lower frame 20A will be omitted herein.

As shown in FIG. 2, the image scanning unit 5 includes an image sensor unit 52, a guide shaft 62, and a belt driving mechanism 53. The image sensor unit 52 includes an image sensor 50 and a carriage 51. The image sensor 50 is a contact type image sensor (CIS) that is configured to: irradiate light to a document as a scanned original; photoelectrically convert light reflected from the document into an electrical signal; and output the electrical signal.

The image sensor 50 includes a case 49 that is mounted on the carriage 51. A longitudinal direction of the case 49 is defined as a primary scanning direction and a transverse direction of the case 49 is defined as a secondary scanning direction (see FIG. 4). The image sensor 50 is disposed to be movable below the platen glass 21 in the secondary scanning direction.

The carriage 51 is fitted to the guide shaft 62 that is provided in a width direction of the lower frame 20A. The carriage 51 is driven by the belt driving mechanism 53 to slide on the guide shaft 62. The image sensor 50 is mounted on the carriage 51 that moves on the guide shaft 62 and allows the image sensor 50 to be in contact with the platen glass 21, whereby the image sensor 50 is moved back and forth in the secondary scanning direction in parallel to the platen glass 21.

Figure 3:
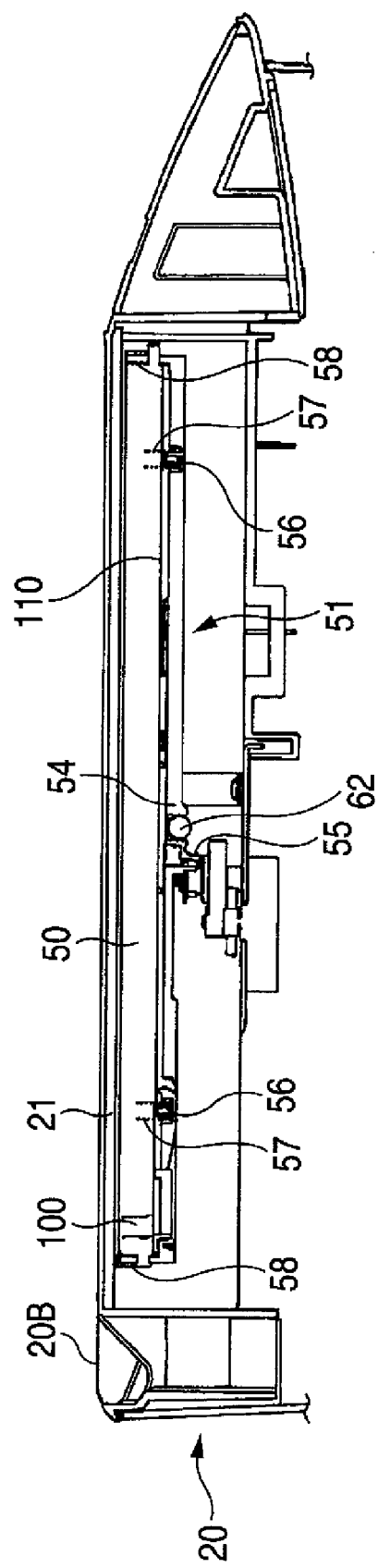
FIG. 3 is a longitudinal sectional view illustrating an important part of the scanning platform.

As shown in FIG. 3, the carriage 51 is mounted thereon with the image sensor 50. A shaft receiving portion 62 is formed on the bottom of the carriage 51, the shaft receiving portion 62 being fitted to the guide shaft 62 from above. The carriage 51 is supported by the guide shaft 62 so as to be slidable along an axial direction of the guide shaft 62, while the shaft receiving portion 54 being fitted into the guide shaft 62.

Adjacent to the shaft receiving portion 54, a belt holding portion 55 is formed to protrude downward. The belt holding portion 55 holds a timing belt 61 of the belt driving mechanism 53, to thereby couple the carriage 51 with the timing belt 61. Accordingly, driving force is supplied to the carriage 51 from the belt driving mechanism 53 for moving the carriage 51 on the guide shaft 62. The detailed description of belt driving mechanism 53 will be omitted herein.

On a bottom portion 71 of the carriage 51, a pair of spring receiving portions 56 is formed at two opposite positions in the primary scanning direction of the carriage 51. Coil springs 57 are positioned by the spring receiving portions 56 and are disposed between the image sensor 50 and the carriage 51. The image sensor 50 mounted on the carriage 51 closely contacts the bottom surface of the platen glass 21 due to an urging force of the coil spring 57.

A pair of rollers 58 is disposed at each longitudinal end of the image sensor 50. Due to the rollers 58, the image sensor 50 smoothly moves while closely contacting with the bottom surface of the platen glass 21 in accordance with the movement of the carriage 51. The rollers 58 serve as spacers for keeping a constant distance between the image sensor 50 and the platen glass 21.

As described herein, the image sensor 50 and the platen glass 21 are not actually configured to be in contact with each other, due to the distance kept therebetween by the rollers 58. However, it can substantially be said that the image sensor 50 closely contacts the bottom surface of the platen glass 21, as described above.

Hereinafter, a configuration of the image sensor unit 52 will be described in detail.

Figure 4:
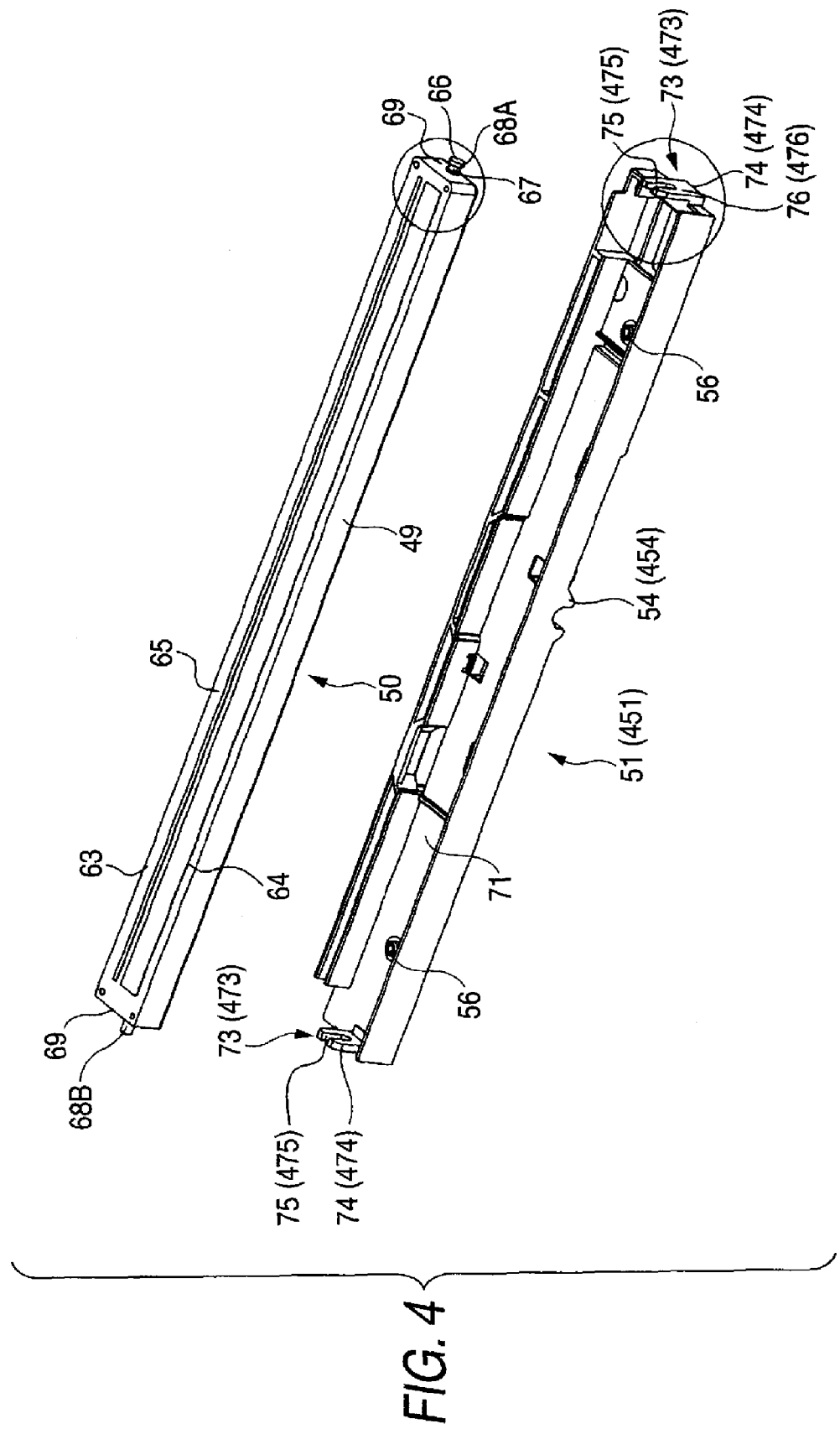
FIG. 4 is a perspective view illustrating a configuration of an image sensor and a carriage.

The image sensor unit 52 is configured by the image sensor 50 and the carriage 51, as described above. As shown in FIG. 4, the image sensor 50 includes a rectangular solid shaped case 49, a top surface 63 of which has a narrow and longitudinal shape in a plan view. A light guiding member 64 that guides light emitted from a light source, such as an LED 100 (Light Emitting Diode), installed in the case 49 is disposed along the longitudinal direction of the case 49 on the top surface 63 of the case 49. The light emitted from the LED 100 is guided through the light guiding member 64 to the platen glass 21 that is opposed to the top surface 63 of the case 49.

On the top surface 63 of the case 49, a plurality of condenser lenses 65 are arranged along the longitudinal direction of the case 49 so as to be parallel to the light guiding member 64. In the case 49, a plurality of photoelectric conversion elements 110 are arranged below the condenser lenses 65 along the condenser lenses 65.

The light emitted from the LED 100 is irradiated to a document (scanned original) placed on the platen glass 21. The light reflected by the document is condensed on the photoelectric conversion elements 110 by the condenser lenses 65. The photoelectric conversion elements 110 output electrical signals in accordance with intensity of the reflected light (received light). In this manner, the image sensor 50 outputs images of the document (scanned original) as electrical signals.

A connector unit (not shown) is provided on the bottom surface of the case 49 of the image sensor 50 at one end in the longitudinal direction of the case 49. The connector unit is electrically connected to the LED and the photoelectric conversion elements of the image sensor 50 and serves to input and output electrical signals to and from a controller. An electrical cable (not shown) is connected to the connector unit and the image sensor 50 is electrically connected to the controller of the image scanning device 1 through the electrical cable. The controller of the image scanning device 1 may include: a CPU for operating a variety of operations; a ROM for storing a variety of control programs: a RAM for temporarily storing data; and an ASIC (Application Specific Integrated Circuits) for controlling a variety of driving circuits and interfaces. An electrical signal path is formed between the image sensor 50 and the controller by the electrical cable. Since the connector unit is not essential to the image scanning device 1, detailed description will be omitted.

The longitudinal direction of the case 49 of the image sensor 50 is defined as the primary scanning direction for scanning an image. The length of the primary scanning direction, that is, the length in the longitudinal direction of the case 49 of the image sensor 50 corresponds to a scanned original having the maximum size which is scannable by the image sensor 50. In the image scanning device 1 according to the first example of the present invention, the image sensor 50 has a length sufficient for scanning an A4-sized scanned original.

Figure 5B:
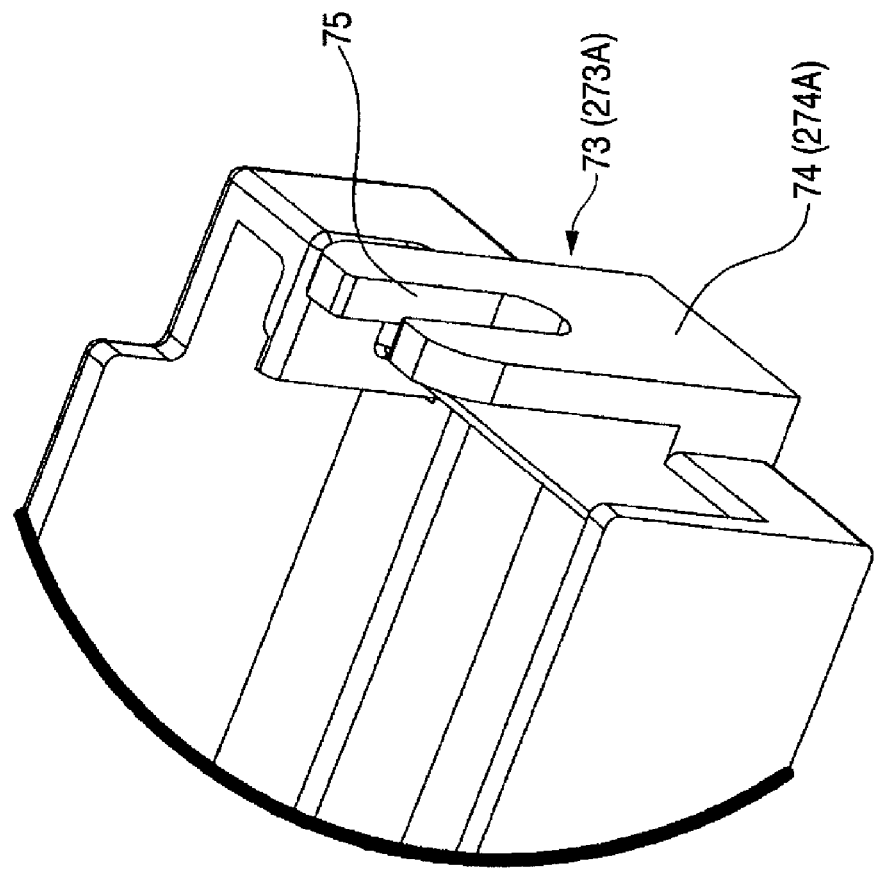
FIG. 5B is a partially enlarged view of the carriage shown in FIG. 4.
Figure 5A:
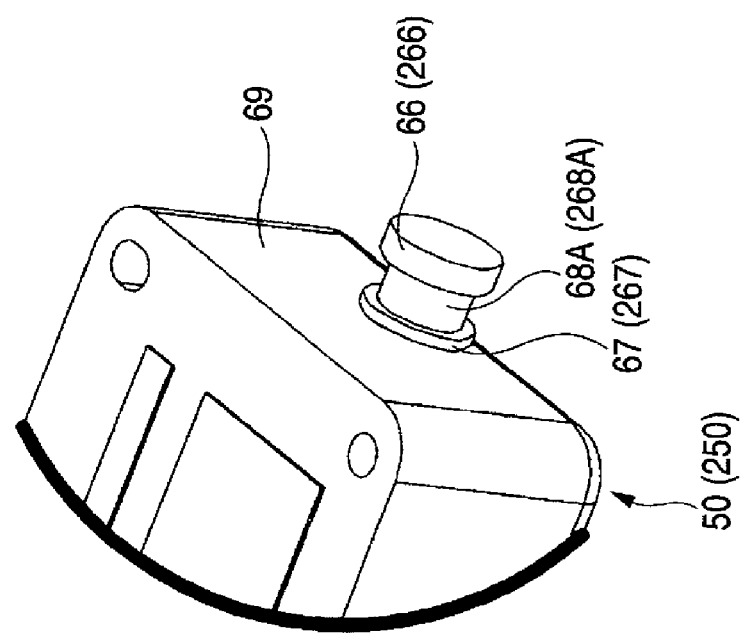
FIG. 5A is a partially enlarged view of the image sensor shown in FIG. 4.
Figure 6:
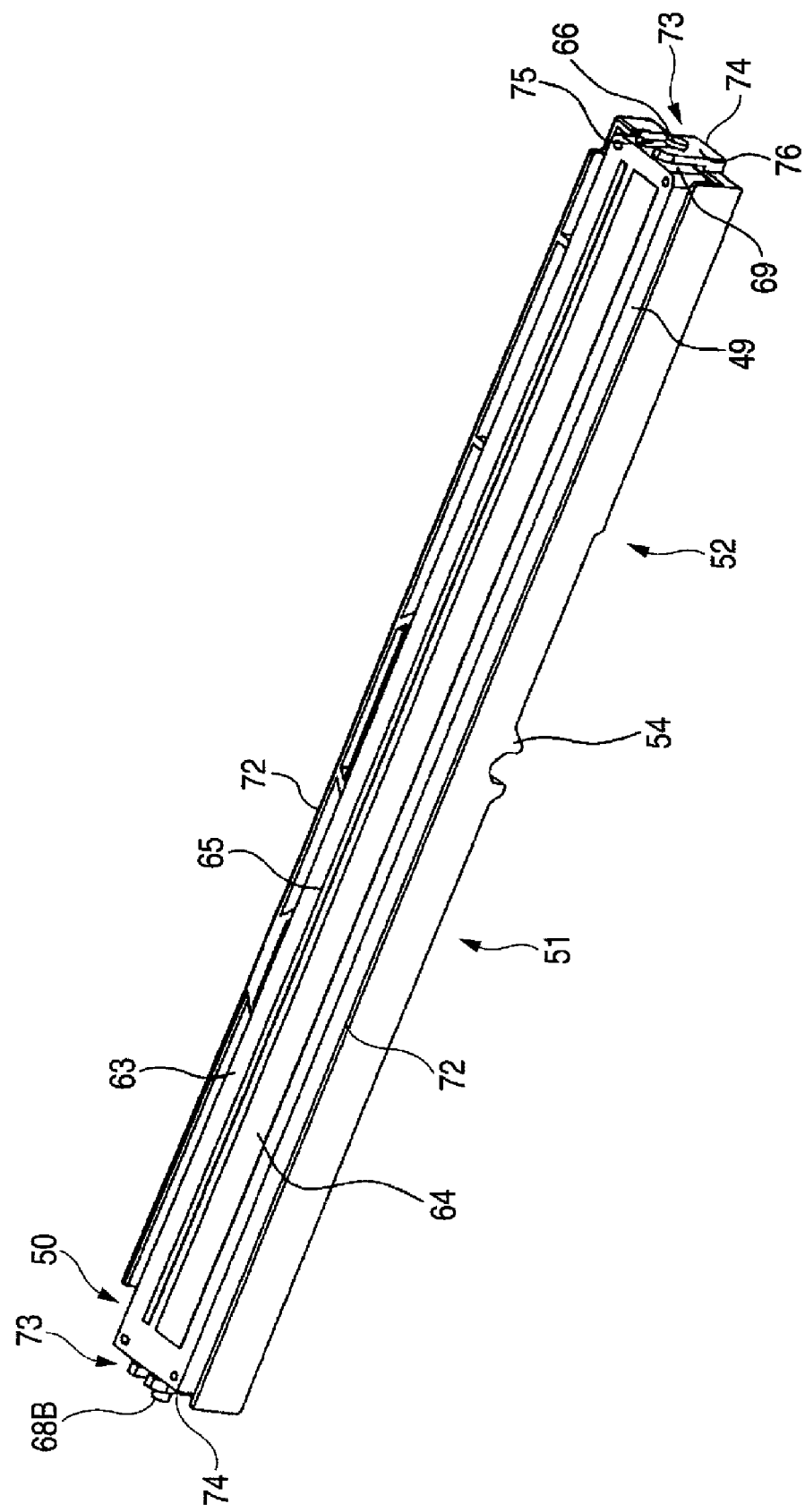
FIG. 6 is a perspective view illustrating an image sensor unit in which the carriage is mounted with the image sensor.

As shown in FIGS. 4, 5A, and 6, shaft portions 68A and 68B are disposed at both ends of the case 49 of the image sensor 50. The shaft portions 68A and 68B serve to position the image sensor 50 in the secondary scanning direction relative to the carriage 51. In the image sensor 50, when an inner weight distribution thereof is almost uniform in the transverse direction, each of the shaft portions 68A and 68B may be disposed substantially at the center of the end face 69 in the transverse direction of the case 49. In a case where the inner weight distribution of the image sensor is not uniform in the transverse direction, the two shaft portions may be disposed at both end faces 69 and substantially on a line extending in the longitudinal direction of the image sensor case and passing the center of gravity.

By providing the shaft portions 68A and 68B at positions described above where a moment for rotating the image sensor 50 about the axis of the shaft portions 68 is balanced out, the posture of the image sensor 50 relative to the carriage 51 is stabilized during a scan of an image performed by moving (scanning) the image sensor 50. As a result, a gap between the upper surface of the image sensor 50 and the bottom surface of the platen glass 21 is kept constant and thus the image sensor 50 scans image of the document satisfactorily.

Figure 7:
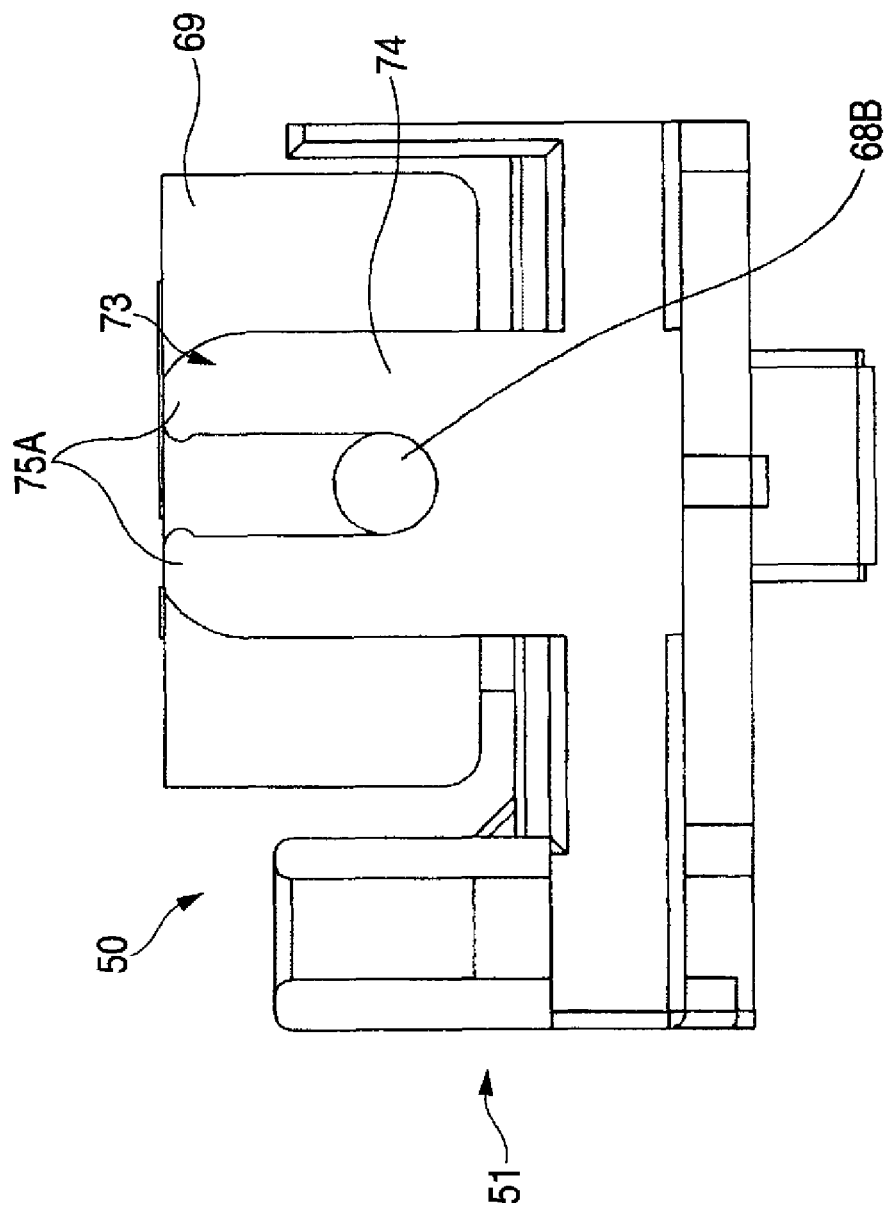
FIG. 7 is a side view of an image sensor unit according to a first modified example of the first example.

In a case where the shaft portions 68A and 68B are provided at positions described above, the shaft portions 68A and 68B are disposed within a projection area of the end faces 69. The projection area defined herein is an area formed by projecting the end faces 69 in a direction parallel to the longitudinal direction of the case 49 of the image sensor 50, when the end faces 69 are viewed from the front of the image scanning device 1 (see FIG. 7). Only the shaft portion 68B is shown in FIG. 7, but the same is true of the shaft portion 68A protruding from the opposite end face 69.

Accordingly, since the lengths in the secondary scanning direction of members other than essential members (such as LED, light guiding member, condenser lens, and photoelectric conversion element) disposed inside the case 49 of the image sensor 50 can be made unnecessary, it is possible to reduce the size of the image sensor 50, whereby the size of the carriage 51 (retention member), the size of the image sensor unit 52, and the size of the image scanning device 1, are reduced.

An abutment portion 67 is formed at a base end of one shaft portion 68A of the pair of shaft portions 68A and 683 and a protruded portion 66 is formed at the free end thereof.

As shown in FIGS. 4, 5B, and 6, the carriage 51 has a box shape of which the top face is opened so as to mount the image sensor 50 therein. As shown in FIG. 4, the carriage 51 has a bottom portion 71 and walls 72 rising upward from both ends in the secondary scanning direction of the bottom portion 71. A pair of bearing portions 73 is formed at both ends in the primary scanning direction of the bottom portion 71. The pair of bearing portions 73 is disposed at positions that engage with the pair of shaft portions 68A and 68B, respectively. In each bearing portion 73, a U-shaped groove 75 fitted to the shaft portion 68 is formed in a protrusion 74 protruding upward from the bottom portion 71.

In the bottom portion 71, spring receiving portions 56 are disposed at two opposite positions in the primary scanning direction of the carriage 51. The spring receiving portions 56 may be disposed at positions where the center of each of the coil springs 57 positioned by the spring receiving portions substantially intersects with an axis of the shaft portions 68.

Hereinafter, a procedure of assembling the image sensor 50 and the carriage 51 into the image sensor unit 52 will be described with reference to FIGS. 4-6.

First, the bottom surface (not shown) opposing the top surface 63 of the image sensor 50 and the bottom portion 71 of the carriage 51 are disposed to face each other so that both ends of the image sensor 50 and the carriage 51 in the primary scanning direction match with one another. Next, the shaft portions 68A and 68B of the image sensor 50 are inserted into the grooves 75 of the bearing portions 73 formed on the carriage 51. Accordingly, the bottom surface (not shown) opposing the top surface 63 of the image sensor 50 abuts the coil springs 57 positioned by the spring receiving portion 56 provided in the bottom portion 71 of the carriage 51. The image sensor 50 is urged toward a direction away from the carriage 51 by the coil springs 57.

In this state, the image sensor 50 is positioned in the secondary scanning direction relative to the carriage 51. That is, by appropriately designing the widths of the grooves 75 in the transverse direction and the diameters of the shaft portions 68A and 68B, the image sensor 50 is positioned in the secondary scanning direction relative to the carriage 51.

The positioning of the image sensor 50 relative to the carriage 51 in the primary scanning direction is performed by engaging the protrusion 74 of the bearing portion 73 with the abutment portion 67 and the protruded portion 66 formed in the shaft portion 68A. By appropriately designing the thickness of the protrusion 74 (dimension of the groove 75 in the primary scanning direction) and the distance between the abutment portion 67 and the protruded portion 66, the image sensor 50 is positioned in the primary scanning direction relative to the carriage 51 with high accuracy.

The abutment portion 67 and the protruded portion 66 formed in the shaft portion 68A of the image sensor 50 serve as a first positioning member, and the bearing portion 73 of the carriage 51 serves as a second positioning member.

The abutment portion 67 and the protruded portion 66 formed in the shaft portion 68A serve as larger diameter portions, and the shaft portion 68A serves as a smaller diameter portion sandwiched between the larger diameter portions (the abutment portion 67 and the protruded portion 66).

The groove 75 formed in each bearing portion 73 of the carriage 51 has a width defined in the secondary scanning direction and is formed in U-lettered shape (see FIG. 5B) that is opened toward the platen glass 21 when the image sensor unit is installed in the image scanning device 1. Accordingly, the shaft portions 68A and 68B inserted into the grooves 75 are movable along the grooves 75. That is, the image sensor 50 is movable in the direction toward the platen glass 21 with respect to the carriage 51 in response to expansion and contraction of the coil spring 57.

As described above, the image sensor 50 is rotatably and movably supported by the carriage 51, and is positioned in the primary scanning direction and the secondary scanning direction (see FIG. 6).

In the image scanning device 1 according to the first example, the shaft portions 68A and 68B protrude from both end faces 69 in the longitudinal direction of the case 49 of the image sensor 50, and the first positioning member configured by the abutment portion 67 and the protruded portion 66 is formed in the shaft portion 68A, which is one of the shaft portions 68A and 68B. The bearing portions 73 are formed at both ends in the primary scanning direction of the carriage 51. One of the two bearing portions 73 positions the case 49 in the longitudinal direction thereof relative to the carriage 51 by engaging with the abutment portion 67 and the protruded portion 66 provided in the shaft portion 68A. Accordingly, compared with a conventional configuration where a length in the secondary scanning direction of the positioning member is included in a length of the transverse direction of the image sensor unit, it is possible to reduce the size in the secondary scanning direction of the image sensor unit 52.

In the first example, the abutment portion 67 and the protruded portion 66 are formed monolithically with the shaft portion 68A. However, at least one of the abutment portion 67 and the protruded portion 66 may be formed as a member separate from the case 49 and attachable to the shaft portion 68A.

Since the first positioning member, which is configured by the abutment portion 67 and the protruded portion 66, is formed in the shaft portion 68A, which is one of the pair of shaft portions 68A and 68B, degree of freedom in design is enhanced compared with the case where a member for determining the primary scanning direction is formed in both shaft portions 68A and 68B. In a case where a member for determining the primary scanning direction is designed to be formed in both shaft portions 68A and 68B, a size tolerance of the image sensor 50 and a size tolerance of the carriage 51 should be matched with each other with high precision, and thus the production yield of components may be deteriorated.

The groove 75 formed in each bearing portion 73 of the carriage 51 has a width defined in the secondary scanning direction and is formed in U-lettered shape (see FIG. 5B) that is opened toward the platen glass 21 when the image sensor unit is installed in the image scanning device 1. Accordingly, the shaft portions 68A and 68B inserted into the grooves 75 are movable along the grooves 75. That is, the image sensor 50 is movable in the direction toward the platen glass 21 with respect to the carriage 51 in response to expansion and contraction of the coil spring 57.

Accordingly, even when a gap between the bottom surface of the platen glass 21 and the carriage 51 varies due to various factors, the gap between the top surface 63 of the image sensor 50 and the bottom surface of the platen glass 21 can be kept constant. Thus, the image sensor 50 can satisfactorily scan images from the document.

When the spring receiving portions 56 are disposed at positions where the center of each of the coil springs 57 positioned by the spring receiving portions substantially intersects with an axis of the shaft portions 68, the substantial center in the secondary scanning direction of the image sensor 50 is urged by the coil spring 57.

Accordingly, when the image sensor 50 slides on the guide shaft 62, a moment for rotating the image sensor about the axis of the shaft portions 68 is reduced, thereby enabling smooth movement of the image sensor 50.

In the first example, as shown in FIGS. 4, 5B, and 6, the groove 75 is formed in a U-lettered shape. The groove 75 may be provided with a retaining portion 75A as shown in FIG. 7. By providing the retaining portion 75A, the shaft portion 68 is prevented from accidentally being pulled out from the groove 75.

In the first example, as shown in FIGS. 4, 5A, 5B, and 6, the shaft portion 68 is disposed in the image sensor 50, and the bearing portion 73 is disposed in the carriage 51.

However, for example, as shown in FIGS. 8-10B, the bearing portion may be disposed in the image sensor and the shaft portion may be disposed in the carriage. Hereinafter, this configuration will be described in detail.

Figure 8:
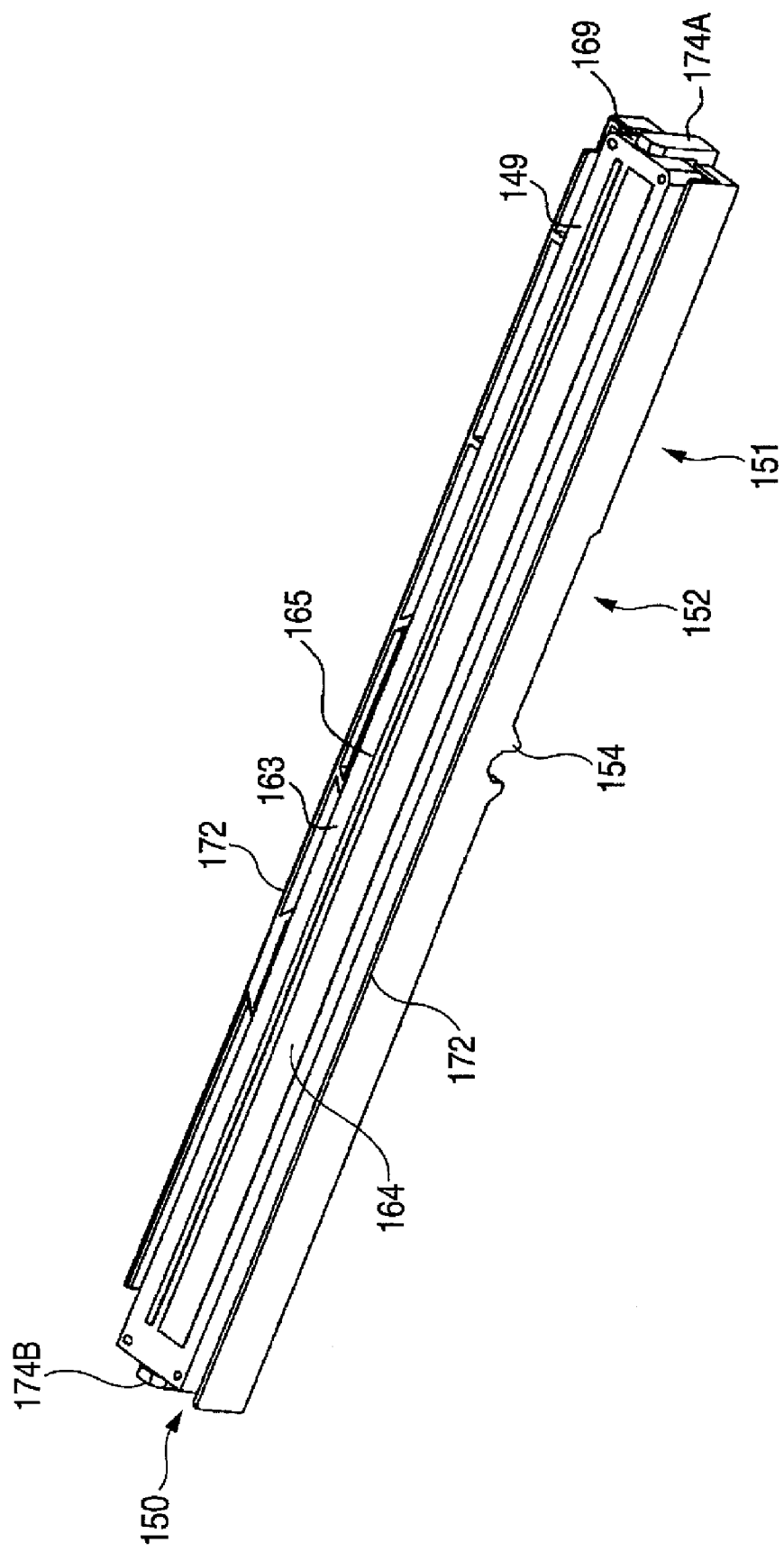
FIG. 8 is a side view of an image sensor unit according to a second modified example of the first example.
Figure 9:
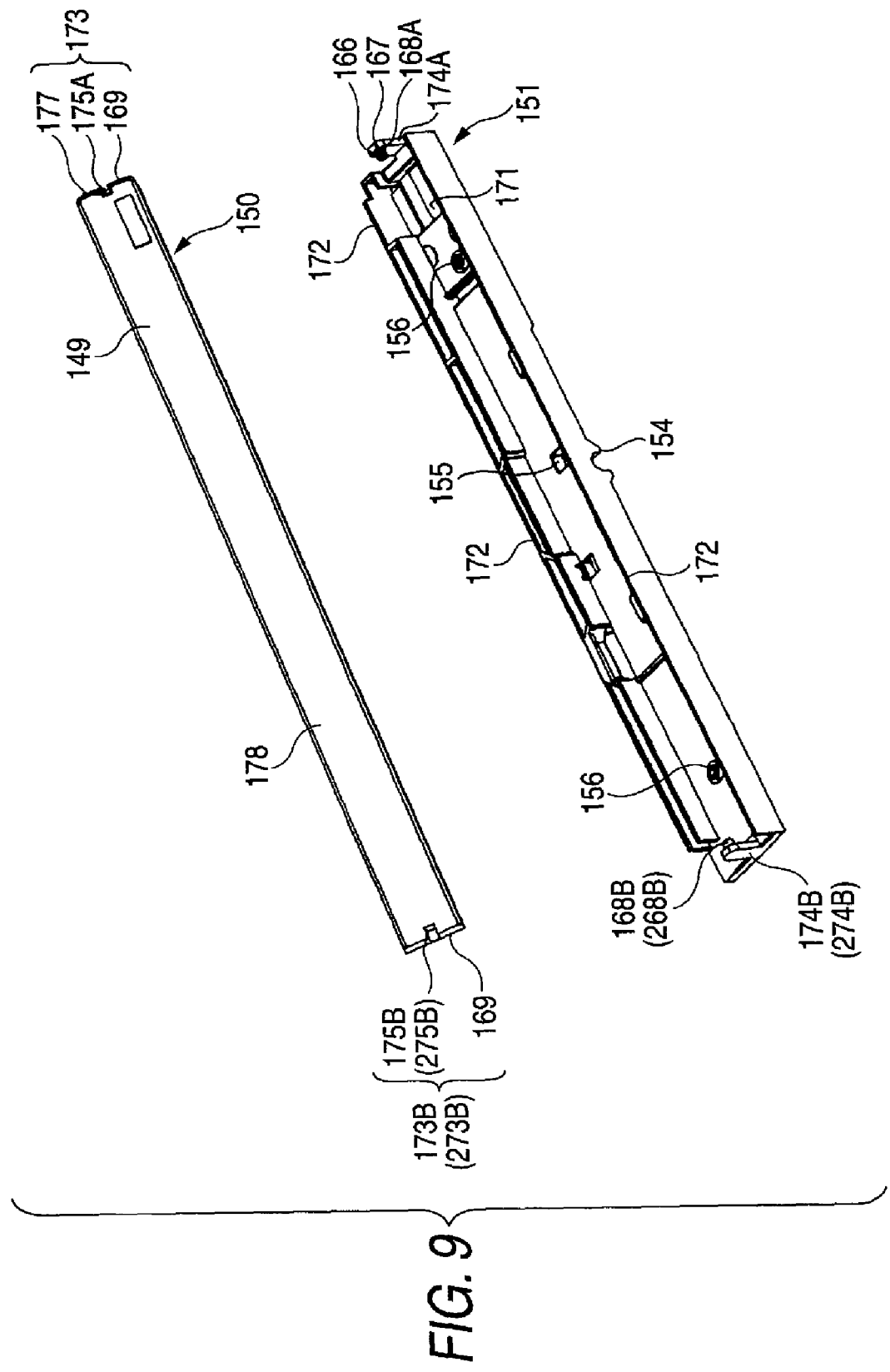
FIG. 9 is a perspective view of an image sensor and a carriage according to the second modified example of the first example as viewed from the rear side.

As shown in FIGS. 8, 9, and 10A, bearing portions 173A and 173B are provided at both longitudinal ends of a case 149 of an image sensor 150. The bearing portions 173A and 173B are provided with bearing grooves 175A and 175B, respectively. The bearing grooves 175A and 175B are formed in an inverted U-letter shape at the center thereof having a width defined in the secondary scanning direction. The bearing groove 175A is fitted with a shaft portion 168A of a carriage 151 to be described later and the bearing groove 175B is fitted with a shaft portion 168B of the carriage 151 to be described later, whereby the position of the image sensor 150 is determined in the secondary scanning direction. A groove portion 177 is formed continuous with the bearing groove 175A. The groove portion 177 is formed inside the bearing groove 175A and has a width defined in the longitudinal direction of the case 149. The groove portion 177 serves to position the image sensor 150 in the primary scanning direction by being engaged with a protruded portion 166 and an abutment portion 167 formed in the shaft portion 168A of the carriage 151.

As shown in FIGS. 9 and 10A, protrusions 174A and 174B are protruded upward from both ends in the primary scanning direction of the bottom portion 171 of the carriage 151. The shaft portions 168A and 168B protrude from surfaces of the protrusions 174A and 174B, respectively, the surfaces facing with each other. The pair of shaft portions 168 is disposed at positions where the shaft portions 168 engage with the bearing grooves 175A and 175B.

The abutment portion 167 is formed at a base end portion of the shaft portion 168A, and the protruded portion 166 is formed at a free end portion of the shaft portion 168A. In the bottom portion 171, spring receiving portions 156 are disposed at two opposite positions in the primary scanning direction of the carriage 151. The spring receiving portions 156 may be disposed at positions where the center of each of the coil springs 157 positioned by the spring receiving portions substantially intersects with an axis of the shaft portions 168.

Hereinafter, a procedure of assembling the image sensor 150 and the carriage 151 into the image sensor unit 152 will be described with reference to FIGS. 8-10B.

By inserting the shaft portions 168 into the bearing grooves 175, the image sensor 150 is positioned in the secondary scanning direction relative to the carriage 151. That is, by appropriately designing the widths of the bearing grooves 175 and the diameters of the shaft portions 168, the image sensor 150 is positioned in the secondary scanning direction relative to the carriage 151.

The positioning of the image sensor 150 relative to the carriage 151 in the primary scanning direction is performed by engaging end face 169 and the groove portion 177 of the bearing portion 173A with the abutment portion 167 and the protruded portion 166. By appropriately designing the distance from the end face 169 to the groove portion 177 and the distance from the abutment portion 167 to the protruded portion 166, the image sensor 150 is positioned in the primary scanning direction relative to the carriage 151 with high accuracy.

The end face 169 and the groove portion 177 serve as the first positioning member, and the abutment portion 167 and the protruded portion 166 serve as the second positioning member.

According to the configuration described above with reference to FIGS. 8-10B, it is possible to obtain the same advantages as those described in the first example.

The positioning of the image sensor 150 relative to the carriage 151 in the primary scanning direction may be defined by the groove portion 177 and the protruded portion 166. That is, by appropriately designing the width of the groove portion 177 and the thickness of the protruded portion 166, the image sensor 150 is positioned in the primary scanning direction relative to the carriage 151.

Here, the groove portion 177 serves as the first positioning member and the protruded portion 166 serves as the second positioning member.

According to this configuration, it is possible to obtain the same advantages as the above-mentioned advantages of the first example of the present invention.

As another modified example of the first example of the present invention, the image sensor unit may be configured such that: a bearing portion is provided in one of both end faces of the image sensor; a shaft portion is provided in the other end face; a shaft portion is provided in one of both end faces of the carriage; and a bearing portion is provided in the other end face.

Figure 11A:
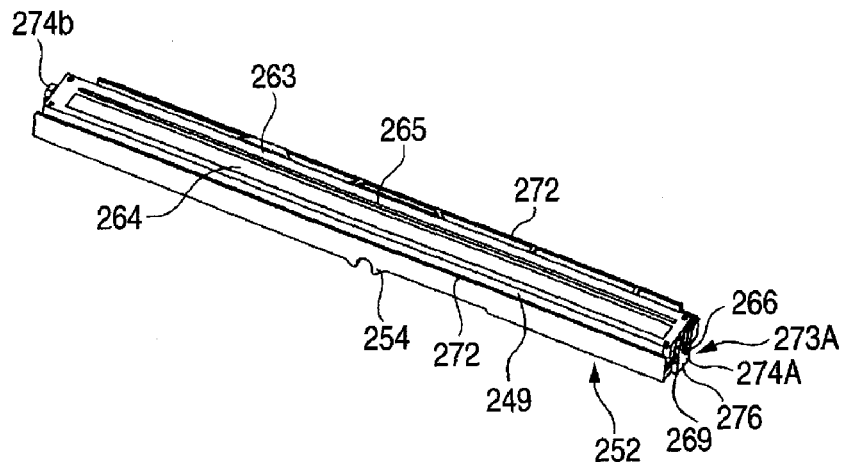
FIG. 11A is a perspective view illustrating an image sensor unit according to a third modified example.
Figure 11B:
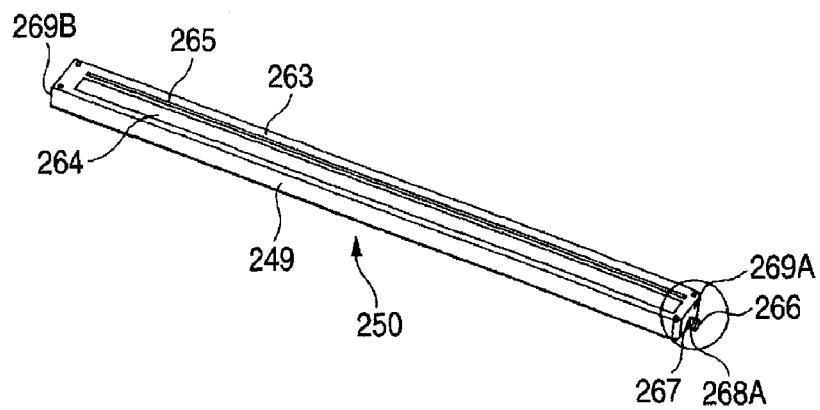
FIG. 11B is a perspective view illustrating the image sensor according to the third modified example.
Figure 11C:
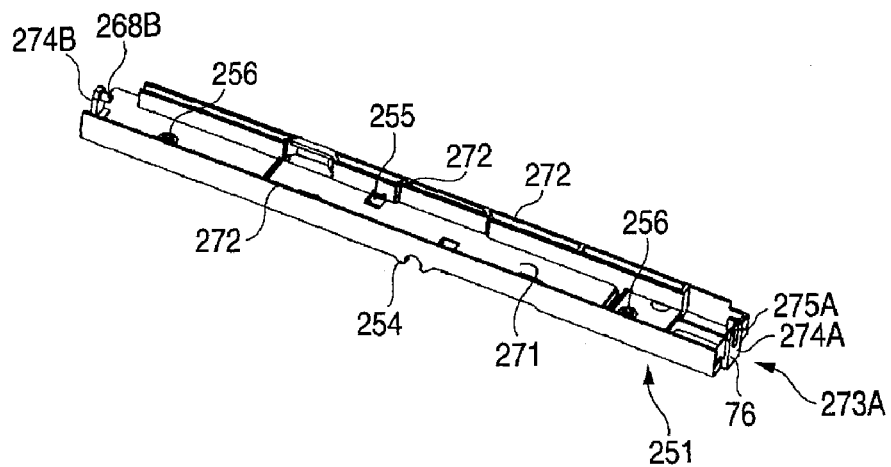
FIG. 11C is a perspective view illustrating the carriage according to the third modified example.
Figure 12A:
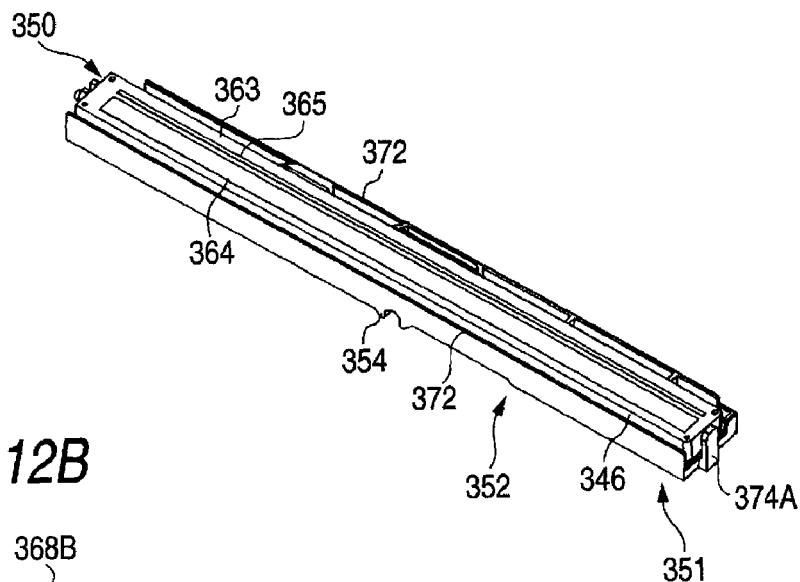
FIG. 12A is a perspective view illustrating an image sensor unit according to a fourth modified example of the first example.
Figure 12B:
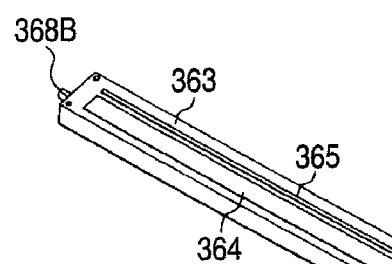
FIG. 12B is a perspective view illustrating an image sensor according to the fourth modified example.
Figure 12C:
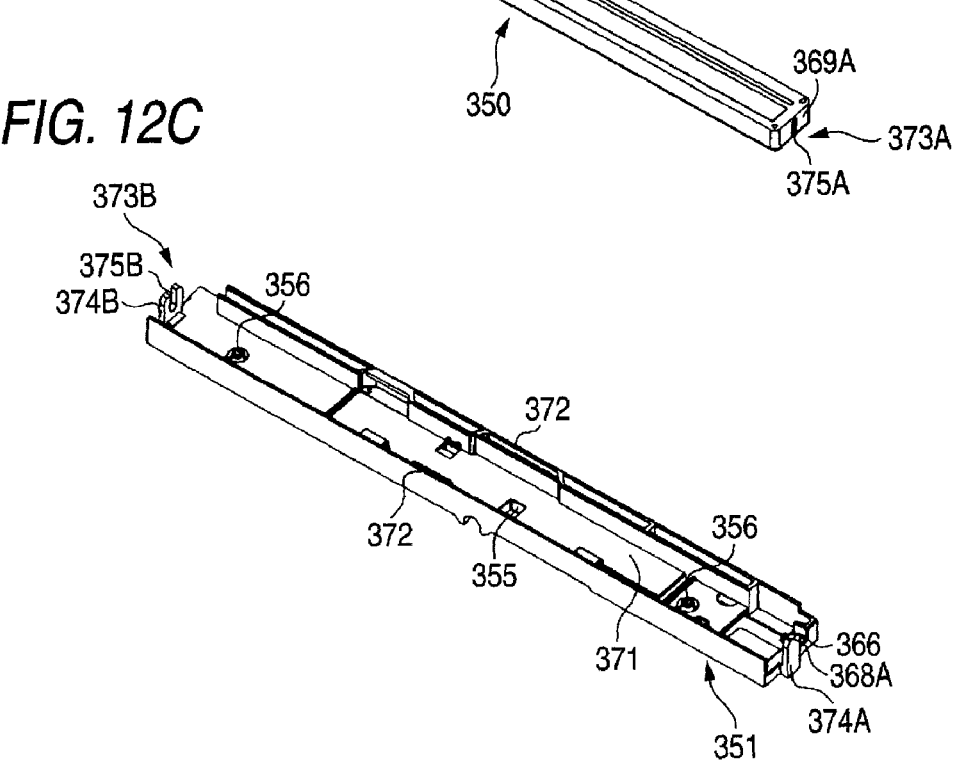
FIG. 12C is a perspective view illustrating a carriage according to the fourth modified example.

In this configuration, as shown in FIGS. 9 and 11, the positioning of the image sensor 250 relative to the carriage 251 in the secondary scanning direction is defined by allowing the bearing groove 275B (see FIG. 9) and the shaft portion 268A provided in the image sensor 250 to engage with the shaft portion 268B (see FIG. 9) and the groove 275A provided in the carriage 251. The positioning of the image sensor 250 relative to the carriage 251 in the primary scanning direction is defined by engaging the protrusion 274A of the bearing portion 273A with the abutment portion 267 and the protruded portion 266 formed in the shaft portion 268A.

By appropriately designing the width of the bearing groove 275B (see FIG. 9), the diameter of the shaft portion 268B, the width of the groove 275A, and the diameter of the shaft portion 268A, the image sensor 250 is positioned relative to the carriage 251 in the secondary scanning direction.

As shown in FIGS. 5A and 5B, the positioning of the image sensor 250 relative to the carriage 251 in the primary scanning direction is defined by engaging the protrusion 274A of the bearing portion 273A with the abutment portion 267 and the protruded portion 266 formed in the shaft portion 268A. That is, by appropriately designing the thickness of the protrusion 274A and the distance from the abutment portion 267 to the protruded portion 266, the image sensor 250 is positioned in the primary scanning direction relative to the carriage 251.

The abutment portion 267 and the protruded portion 266 formed in the shaft portion 268A of the image sensor 250 serve as the first positioning member, and the bearing portion 273A of the carriage 251 serves as the second positioning member.

Alternatively, as shown in FIGS. 10A, 10B, 12A, 12B, and 12C, the shaft portion 368B and the bearing groove 375A may be provided in the image sensor 350, and the groove 375B and the shaft portion 368A may be provided in the carriage 351. That is, the positioning of the image sensor 350 relative to the carriage 351 in the secondary scanning direction may be defined by allowing the shaft portion 368B and the bearing groove 375A provided in the image sensor 350 to engage with the groove 375B and the shaft portion 368A provided in the carriage 351, respectively.

In this configuration, by appropriately designing the width of the bearing groove 375A, the diameter of the shaft portion 368A, the width of the groove 375B, and the diameter of the shaft portion 368B, the image sensor 350 is positioned relative to the carriage 351 in the secondary scanning direction.

The positioning of the image sensor 350 relative to the carriage 351 in the primary scanning direction is defined by engaging the end face 369A and the groove portion 377 of the bearing portion 373A with the abutment portion 367 and the protruded portion 366 (see FIGS. 10A and 10B). That is, the image sensor 350 is positioned relative to the carriage 351 in the primary scanning direction, due to the distance from the end face 369A to the groove portion 377 and the distance from the abutment portion 367 to the protruded portion 366.

The end face 369A and the groove portion 377 formed in the shaft portion 350 serve as the first positioning member, and the abutment portion 367 and the protruded portion 366 formed in the carriage 351 serve as the second positioning member.

The positioning of the image sensor 350 relative to the carriage 351 in the primary scanning direction may be defined by engaging the groove portion 377 with the protruded portion 366. That is, the image sensor 350 may be positioned in the primary scanning direction relative to the carriage 351 by appropriately designing the width of the groove portion 377 and the thickness of the protruded portion 366.

In this case, the groove portion 377 serves as the first positioning member, and the protruded portion 366 serves as the second positioning member.

According to this configuration, it is possible to obtain the same advantages as the above-mentioned advantages of the first example of the present invention.

Since the bearing portion 273A (373B) is provided in one of both end faces of the image sensor 250 (350), the shaft portion 268A (368B) is provided in the other end face, the shaft portion 268B (368A) is provided in one of both end faces of the carriage, and the bearing portion 273A (373B) is provided in the other end face, it is possible to prevent the erroneous attachment of the image sensor 250 (350) when assembling the image sensor unit by attaching the image sensor 250 (350) to the carriage 251 (351).

Hereinafter, a configuration of an image sensor unit according to a second example of the present invention will be described.

In the image sensor unit according to the first example of the present invention, the positioning of the image sensor 50 relative to the carriage 51 in the primary scanning direction is defined by engaging the protrusion 74 of the bearing portion 73 with the abutment portion 67 and the protruded portion 66 formed in the shaft portion 68A. On the contrary, in an image sensor unit 462 according to the second example of the present invention, the positioning of an image sensor 450 relative to a carriage 451 in the primary scanning direction is defined by allowing an abutment portion 467 provided in a base end portion of a shaft portion 468B to abut a surface of a protrusion 474B with an urging force of a spring member 500.

An image scanning device according to the second example may be configured as similar to the image scanning device 1 according to the first example except for the above-described point. Hereinafter, the configuration of the image sensor unit 462 different from that of the first example will be described.

Figure 13A:
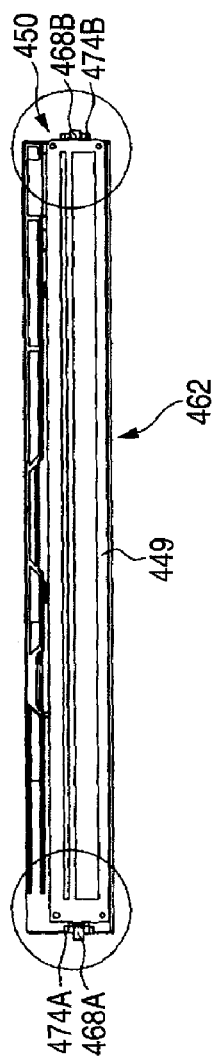
FIG. 13A is a top view illustrating an image sensor unit according to a second example of the present invention.
Figure 13C:
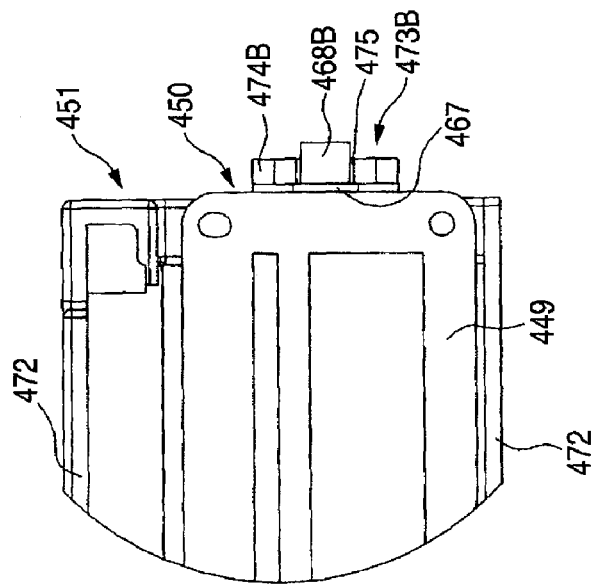
FIG. 13C is a partially enlarged view of the right end portion of the image sensor unit shown in FIG. 13A.
Figure 13B:
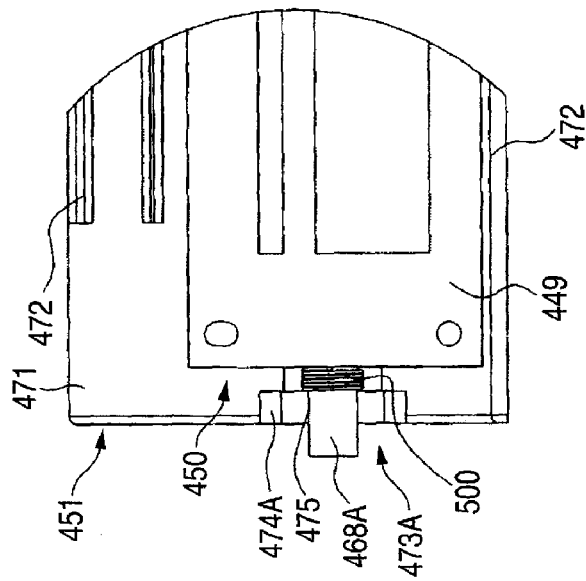
FIG. 13B is a partially enlarged view of the left end portion of the image sensor unit shown in FIG. 13A.

As shown in FIGS. 13A and 13B, shaft portions 468A and 468B are provided in both longitudinal end portions of a case 449 of the image sensor 450. The shaft portions 468A and 468B serve to position the image sensor 450 relative to the carriage 451 in the secondary scanning direction. Each of the shaft portions 468A and 468B may be disposed substantially at the center of end face 469 in the transverse direction of the case 449 of the image sensor 450.

The abutment portion 467 is formed in the base end portion of one shaft portion 468B of the pair of shaft portions 468A and 468B.

As shown in FIGS. 13A and 13B, the carriage 451 includes a bottom portion 471 and a wall 472 rising upward from both ends in the secondary scanning direction of the bottom portion 471. A pair of bearing portions 473 is formed at both ends in the primary scanning direction of the bottom portion 471. The pair of bearing portions 473 is disposed at positions where the bearing portions 473 engage with the pair of shaft portions 468A and 468B, respectively. In each of the bearing portions 473, an U-lettered shape groove 475 engaging with the shaft portion 468 is formed in the protrusion 474 protruding upward from the bottom portion 471.

Hereinafter, a procedure of assembling the image sensor 450 and the carriage 451 into the image sensor unit 452 will be described with reference to FIGS. 4, 13A and 13B.

First, the bottom surface (not shown) opposing to the top surface 463 of the image sensor 450, and the bottom portion 471 of the carriage 451 are disposed opposite to each other so as to match both ends in the primary scanning direction of the image sensor 450 and the carriage 451 with each other. Next, the spring member 500 is fitted through the shaft portion 468A and reduced against the urging force thereof. Next, the shaft portions 468A and 468B of the image sensor 450 are inserted into the grooves 475 of the bearing portions 473A and 473B of the carriage 451. Next, the abutment portion 467 formed in the shaft portion 468B abuts the surface of the protrusion 474B opposite to the abutment portion 467 due to the urging force of the spring member 500 that is fitted through the shaft portion 468A.

In this state, the image sensor 450 is positioned in the secondary scanning direction relative to the carriage 451. That is, by appropriately designing the widths of the grooves 475 and the diameters of the shaft portions 468A and 468B, the image sensor 450 is positioned relative to the carriage 451 in the secondary scanning direction.

According to this configuration, since the abutment portion 467 formed in the shaft portion 468B abuts the surface of the protrusion 474B opposite to the abutment portion 467 due to the urging force of the spring member 500, thereby performing the positioning in the primary scanning direction, it is possible to perform the positioning the image sensor 450 relative to the carriage 451 in the primary scanning direction with a simple configuration and with high accuracy.

What is claimed is:

1. An image sensor unit comprising:
an image sensor that emits light to an object and outputs an electrical signal in accordance with light reflected by the object; and
a retention member that retains the image sensor, wherein the image sensor comprises:
a case that extends in a longitudinal direction; and
a first positioning member that is disposed at one end portion in the longitudinal direction of the case,
wherein the retention member comprises:
a frame that extends in the longitudinal direction; and
a second positioning member that is disposed at one end portion in the longitudinal direction of the frame, and
wherein the case is positioned relative to the frame in the longitudinal direction by engaging the first positioning member with the second positioning member,
wherein supported portions are provided at both ends in the longitudinal direction of the case,
wherein each of the supported portions includes one of a shaft portion and a bearing portion, and
wherein the first positioning member is provided at one of the supported portions.

2. The image sensor unit according to claim 1, wherein the case has a pair of end faces in the longitudinal direction thereof, and
wherein the supported portions are disposed at the end faces respectively such that the supported portions are within areas of the end faces respectively as viewed in the longitudinal direction of the case.

3. The image sensor unit according to claim 2, wherein each of the supported portions is disposed substantially at a center of a corresponding one of the end faces in a direction perpendicular to the longitudinal direction of the case.

4. The image sensor unit according to claim 2, wherein the supported portions are disposed substantially on a line extending in the longitudinal direction of the case and passing a center of gravity of the image sensor.

5. The image sensor unit according to claim 1, wherein the case of the image sensor has shaft portions at both ends thereof in the longitudinal direction,
wherein the frame of the retention member has bearing portions at both ends thereof in the longitudinal direction, and
wherein the first positioning member is provided at one of the shaft portions while the second positioning member is provided at one of the bearing portions in which the one of the shaft portions is supported.

6. The image sensor unit according to claim 5, wherein the one of the shaft portions projects from one of the end portions of the case along the longitudinal direction,
wherein the one of the shaft portions has larger diameter portions as the first positioning member and a smaller diameter portion sandwiched between the larger diameter portions,
wherein the one of the bearing portions has a groove as the second positioning member in which the smaller diameter portion is fitted, and
wherein a dimension of the groove in the longitudinal direction is substantially equal to a dimension of the smaller diameter portion in the longitudinal direction.

7. The image sensor unit according to claim 1, wherein the image sensor further comprises:
a light source that emits light, the light source being disposed within the case;
a light guiding member that is disposed along the longitudinal direction of the case, the light guiding member guiding the light emitted from the light source toward a top surface of the case;
a condenser lens that is disposed along the longitudinal direction of the case; and
a photoelectric conversion element that outputs electrical signal in accordance with intensity of light received through the condenser lens, the photoelectric conversion element being disposed within the case.

8. The image sensor unit according to claim 1, wherein support portions that support the supported portions of the image sensor are provided at both ends in the longitudinal direction of the frame,
   wherein each of the support portions includes either one of a shaft portion and a bearing portion, and
   wherein the second positioning member is provided at either one of the support portions.

9. An image scanning device comprising:
   a platen glass on which a document to be scanned is placed; and
   an image sensor unit that is provided beneath the platen glass to be movable in a predetermined direction along the platen glass, the image sensor unit comprising:
   an image sensor that emits light to an object and outputs electrical signal in accordance with light reflected by the object; and
   a retention member that retains the image sensor,
   wherein the image sensor comprises:
   a case that extends in a longitudinal direction that is perpendicular to the predetermined direction; and
   a first positioning member that is disposed at one end portion in the longitudinal direction of the case,
   wherein the retention member comprises:
   a frame that extends in the longitudinal direction; and
   a second positioning member that is disposed at one end portion in the longitudinal direction of the frame, and
   wherein the case is positioned relative to the frame in the longitudinal direction by engaging the first positioning member with the second positioning member,
   wherein supported portions are provided at both ends in the longitudinal direction of the case,
   wherein each of the supported portions includes one of a shaft portion and a bearing portion, and
   wherein the first positioning member is provided at one of the supported portions.

10. The image scanning device according to claim 9, wherein at least one of the supported portions includes the bearing portion, and
   wherein the bearing portion is formed as a U-lettered shape groove that allows the image sensor to be movable in a direction toward the platen glass.

11. The image scanning device according to claim 9, wherein support portions that support the supported portions of the image sensor are provided at both ends in the longitudinal direction of the frame,
   wherein each of the support portions includes either one of a shaft portion and a bearing portion, and
   wherein the second positioning member is provided at either one of the support portions.

12. The image scanning device according to claim 11, wherein at least one of the support portions includes the bearing portion, and
   wherein the bearing portion is formed as a U-lettered shape groove that allows the image sensor to be movable in a direction toward the platen glass.

* * * * *